No Printed Specification Available
6815X
J. Baker,
Damper
Patented Oct. 28. 1831.
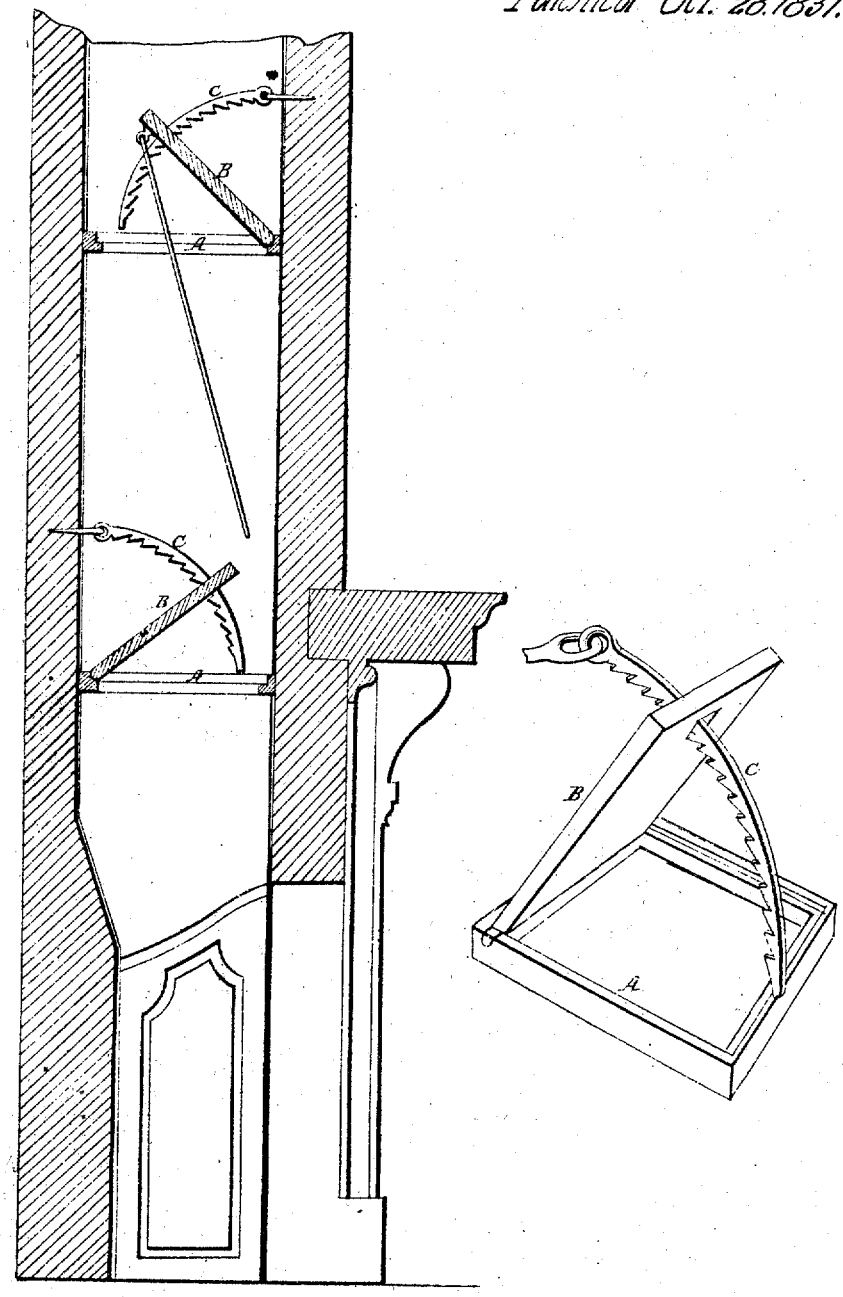

John Baker of Lancaster, county of Lancaster State of Pennsyl-
vania

Letters Patent

The schedule referred to in these Letters Patent, and making part of the same, containing a description in the words of the said John Baker himself of his improvement in regulating the draught of chimneys, called a chimney valve - .

To all to whom these Presents shall come:

Be it known that I John Baker of the city of Lancaster, in the county of Lancaster and state of Pennsylvania, have invented a new and useful improvement in regulating the draught in chimneys and that the following is a full and exact description of the construction and operation of the said machine as invented or improved by me. A frame of cast metal is made to fit the size of the chimney inside, one inch and a quarter broad & an inch thick, with a rabbet, or groove all around on the top and inner side - A thin plate of cast metal is made to fit in this groove with the one end somewhat round, and a pivot at each end of the rounded side to operate as a hinge - A semi circle notch is made in the frame for these pivots to rest in -

This frame is then placed in the chimney, a convenient distance above the mantel piece with the hinge side to the back part of the chimney, it may be built in the wall in the erection of the chimney, or placed in chimneys already built, in the latter case some mortar should be applied to prevent the air from passing between the frame and the chimney -

A piece of wrought iron is formed into a rod, describing a quarter of a circle with a hole at the end through which a staple is driven on the back part of the chimney at a convenient distance above the frame. This rod is made flat with teeth cut in the inner side of the circle, a hole is made through the plate near the front side through which this rod passes, the plate is then raised on the front side to whatever hight the regulation of the chimney may require and is held to any place

6815 X wanted, by the teeth of the rod above mentioned. Some chimnies in cities or towns particularly from their location, do not draw well in windy weather, these chimneys may be greatly improved by placing a second valve at some distance above the first one with the hinge side to the front of the chimney. In that case a rod is fastened to an eye fast to the valve near the opposite side from the hinge which is left long enough to extend within reach from below, to regulate the upper valve. Chimneys, so constructed afford a great safety against fire in the chimney for by shutting the valve or valves, the air is excluded, and forms a damper or complete extinguisher. The [illegible] and frame may be made of wrought or sheet iron.

In testimony that the above is a true specification of my said improvement as before described, I have hereto set my hand and seal the eight day of September in the year of our Lord, one thousand eight Hundred and Thirty One Witnesses
Sam.l Dale
Saml. S. Dale John Baker

[illegible]

598 [illegible]